United States Patent [19]
Allinquant et al.

[11] 3,799,528
[45] Mar. 26, 1974

[54] VEHICLES SELF-PUMPING SUSPENSION STRUT

[76] Inventors: Fernand Michel Allinquant, 53, Avenue Le Notre; Jacques Gabriel Allinquant, 12, Avenue Arouet, both of 92 Sceaux, France

[22] Filed: June 2, 1972

[21] Appl. No.: 259,205

[30] Foreign Application Priority Data
June 8, 1971 France .................. 71.20673
Feb. 21, 1972 France .................. 72.05727
May 16, 1972 France .................. 72.17428

[52] U.S. Cl. ............................... 267/64 R
[51] Int. Cl. ................................ B60g 15/12
[58] Field of Search ...................... 267/64 R

[56] References Cited
UNITED STATES PATENTS
3,222,049   12/1965   Tuczek ................ 267/64 R
3,178,166   4/1965    Kirsch ................ 267/64 R
3,536,312   10/1970   Lohr .................. 267/64 R
3,342,475   9/1967    Naddell ............... 267/64 R Primary Examiner—Gerald M. Forlenza
Assistant Examiner—Robert Saifer
Attorney, Agent, or Firm—Alfred W. Breiner

[57] ABSTRACT

A suspension strut comprising an oleopneumatic suspension chamber carrying a load and separated by a piston from an oleopneumatic reservoir, and an automatic level-control device including a pumping device operated by the reciprocation of the piston in order to pump hydraulic liquid from the suspension chamber into the reservoir, and means for returning the fluid which are actuated by the piston in order to connect the reservoir to the suspension chamber when the suspension strut is extended to less than a given length, so that the suspension level can be higher when the vehicle is stopped than when the vehicle is running.

15 Claims, 8 Drawing Figures

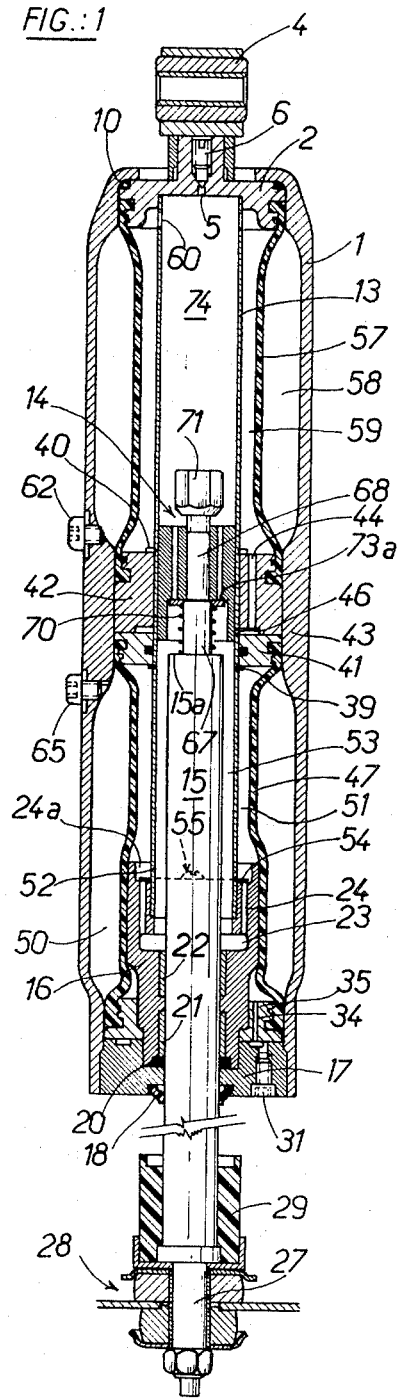

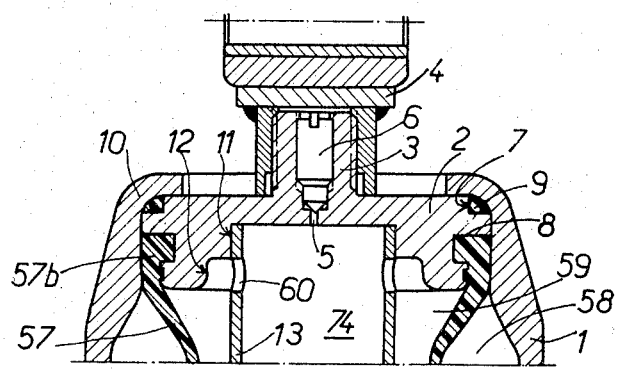
FIG.: 2
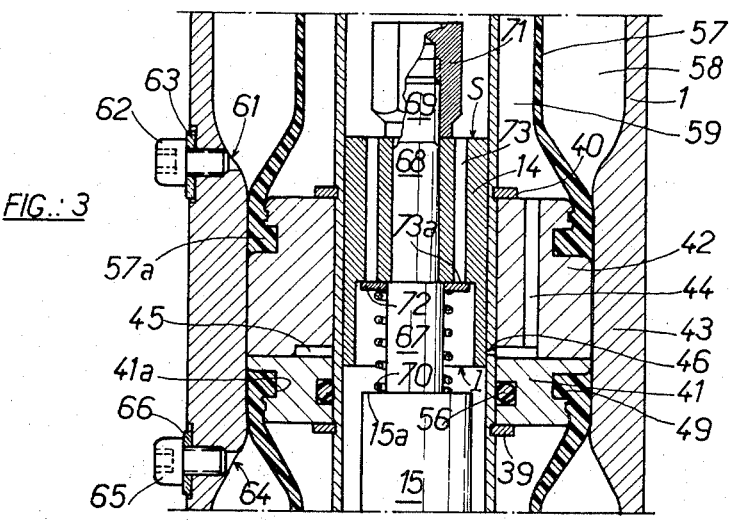
FIG.: 3
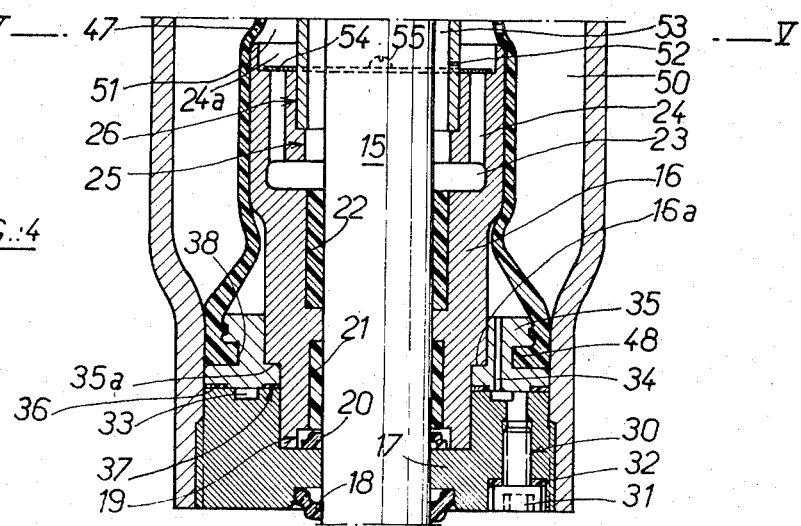
FIG.: 4

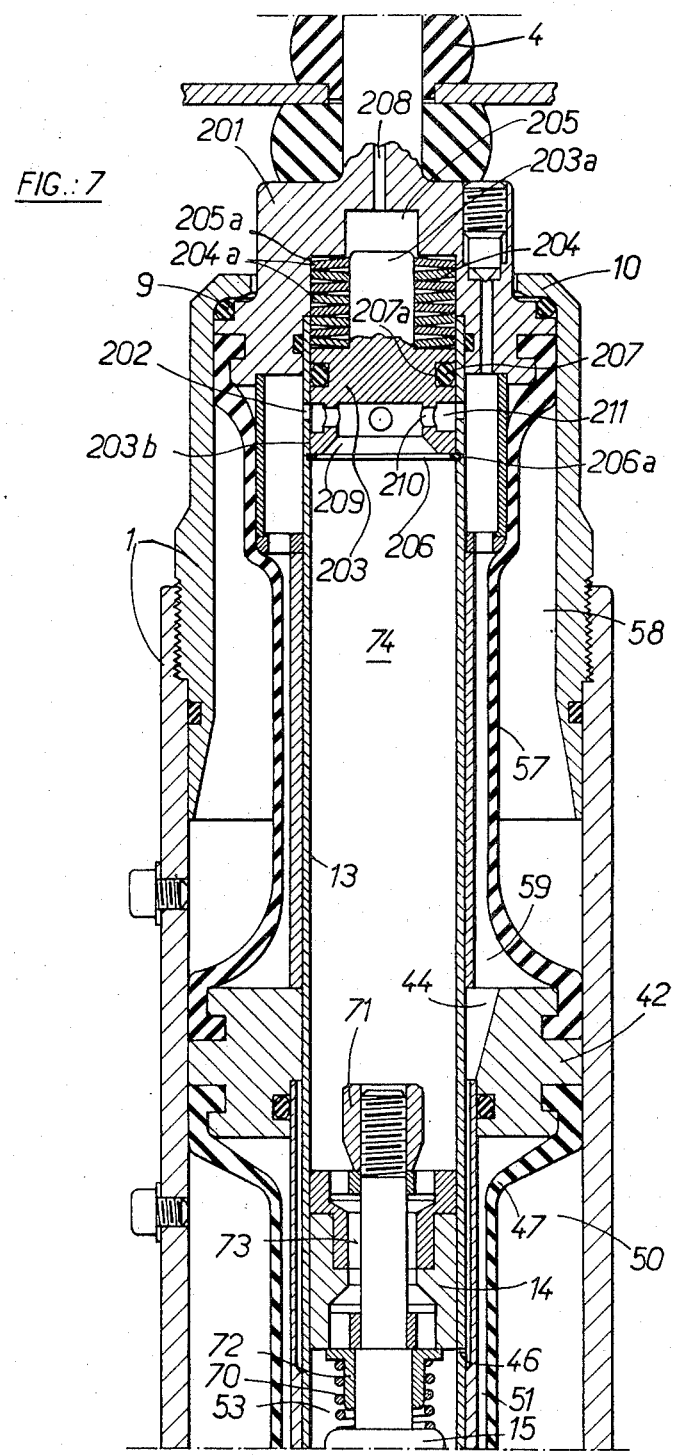
FIG.: 7

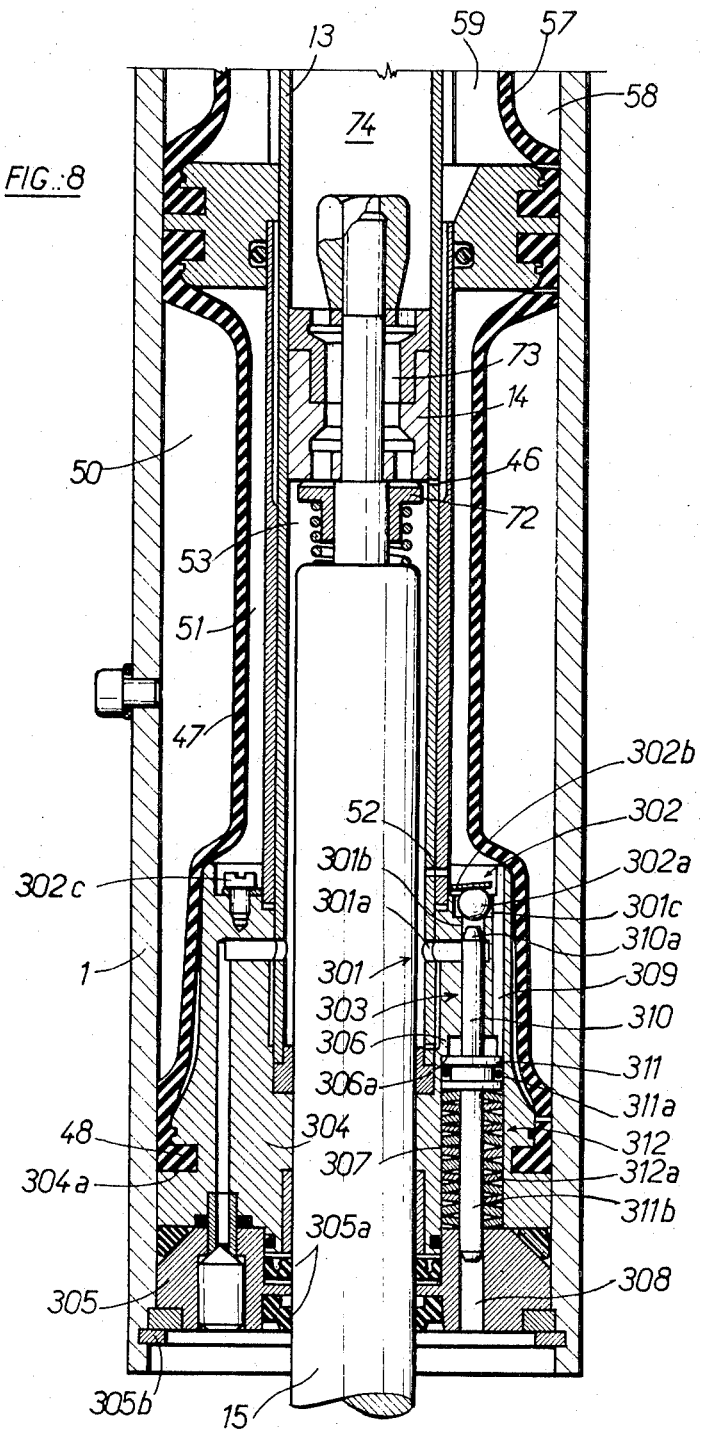

VEHICLES SELF-PUMPING SUSPENSION STRUT

The present invention relates to a strut for effecting elastic suspension of a load, by the compression of a gas in a suspension chamber. It relates, more particularly to a suspension strut which can be used especially for the suspension of a motor vehicle and can also perform the function of a shock absorber, the strut being of the kind in which the suspension chamber is separated by a piston from a reservoir or storage chamber including, for example, an annular compartment through which a rod fixed to the piston passes, and comprising an automatic level control device which operates by a self-pumping action involving the exchange of fluid between the two chambers, this by means of a pumping device actuated by the reciprocating motion of the piston, and a return line which is opened by the piston when the suspension is at its mean level.

In the known embodiments, the pumping device, operated by the reciprocation of the piston as the vehicle travels along, draws fluid from the annular chamber and discharges it into the suspension chamber, thus lifting the suspended part of the vehicle until the piston, on reaching its mean level, opens the return line which goes back to the annular chamber. The piston is thus maintained in the neighborhood of its mean level whilst the vehicle is travelling. When the vehicle stops and the load is removed from it, its suspension strut tend to extend with the result that the return lines are opened, placing the two chambers of each strut in communication so that the suspension returns to its mean level. When the halted vehicle is loaded, even if this only means a single passenger getting in, the extra load applied to the suspension chambers has the result that by compression of the gas which they contain, virtually complete retraction of the strut takes place; the suspension remains completely lowered until the vehicle starts to operate again and return it by the self-pumping action, to its mean level. The ground clearance may therefore be insufficient when the vehicle is halted, and this can give rise to difficulties.

The present invention overcomes this drawback thanks to an improvement which makes it possible, in the halted condition, to maintain the suspended parts of the vehicle above their mean level, their return to this level taking place very rapidly as soon as the vehicle starts.

To this end, in accordance with the invention the pumping device withdraws fluid from the suspension chamber and discharges it into the annular compartment which is subject to the pressure exerted by a pressure container compartment containing hydraulic fluid and gas under pressure, and the return line opens into the suspension chamber.

The piston is subjected on one face to the pressure prevailing in the suspension chamber, this balancing the sum of the load (applied to the strut by the suspended parts of the vehicle) and the force applied by the pressure in the annular compartment to the annular section of the piston around the piston rod. The gas masses contained in the suspension chamber and in the compartment connected to the annular chamber are appropriately designed so that the pressures which develop in the two chambers for the maximum vehicle weight when the vehicle is halted, are preferably such that the extension of the strut will be greater than its mean extension (corresponding to the mean suspension level). As soon as the vehicle starts to travel the suspension returns to its mean level since the pumping device transfers fluid from the suspension compartment to the annular chamber and the return line, by opening, transfers liquid from the annular compartment to the suspension chamber. Thus, equal pressures develop in the two chambers which are thus placed periodically into communication with one another, so that as soon as the vehicle stops, the pressure in the suspension chamber gains the upper hand and acts upon the piston to return the suspension to the initial level.

The vehicle ground clearance is thus greater, when the vehicle is halted, than it is whilst the vehicle is travelling. This arrangement not only makes it possible to avoid the defects referred to hereinbefore on the part of self-pumping suspension struts, but also constitutes a technical advance in relation to the most highly developed suspension systems thus far, which latter comprise a control lever which is used to draw power from the vehicle engine and thus increase the ground clearance when necessary, in particular to clear obstacles such as the lip formed at the change in slope on exit from an underground garage, a curbstone or deep ruts in a country road. The arrangement in accordance with the invention makes it possible to readily clear such obstacles if they occur at the time of starting of the vehicle, without it being necessary to operate any control lever and to wait until the pressure developed with the help of the engine, has raised the suspension.

It is worth pointing out that it is possible, by appropriately choosing the gas masses contained in the suspension pressure container compartment and in the chamber connected to the annular compartment, to maintain the suspension of the halted, loaded vehicle at any desired level. Thus, it would be within the scope of the present invention to set this level when the vehicle is halted, to a value equal to or even less than the mean level.

It is worth pointing out, too, that what permits the level of the loaded, halted vehicle to be regulated to a predetermined value, is the fact that the suspension struts are of a kind in which the pressure in the annular compartment acts in a same direction as the load on an area of the piston which is smaller than the area upon which the pressure in the suspension chamber itself acts. The invention is thus not limited to a suspension strut comprising a piston with a rod, which piston, within a cylinder, separates the suspension chamber from an annular compartment. The suspension chamber could be contained, for example, in a bell-shaped plunger having a rim sliding in a cylinder, the plunger defining in the cylinder a fluid reservoir or storage chamber, delimited laterally by the lateral walls of the bell and the cylinder, at one end by the rim of the bell and at the other by an internal collar in the cylinder, against which said lateral wall of the bell component slides.

In a more general way, the invention therefore relates to a suspension strut, in particular for a motor vehicle, which is responsible for the elastic suspension of a load by the compression of a gas in a suspension chamber, said strut comprising a piston with a first surface upon which there acts the pressure in the suspension chamber in order to support the load, and a second surface of smaller area than the first, upon which there acts in the opposite direction, the pressure furnished by a fluid reservoir or storage chamber, and comprising furthermore a device for automatically regulating the level by a self-pumping action effected by the exchange of fluid between the suspension chamber and the reservoir through a pumping device actuated by the reciprocation of the piston, and through a return line which is opened by the piston when the suspension is located at its mean level, wherein the pumping device draws fluid from the suspension chamber and discharges it into the reservoir which is subjected to the pressure developed by a space, containing gas under pressure; and wherein the return line opens into the suspension chamber.

In practice, the suspension chamber and the reservoir contain a hydraulic liquid designed in particular to damp the suspension. The suspension struts are furthermore often referred to as oleopneumatic shock absorbers, especially in the case where they only carry part of the vehicle weight, the rest of the weight being carried by springs. In conventional oleopneumatic shock absorbers, devices are generally provided to control the damping action by means of biased valves which open and close to throttle the flow of the hydraulic liquid, during operation of the shock absorber.

In one embodiment of the invention, the piston, with a rod, slides in a cylinder which is surrounded by two annular peripheral compartments arranged end to end and each containing an elastic diaphragm separating a space full or compressed gas from a space containing liquid. The space containing the liquid, in one of the peripheral, communicates through openings formed in one end of the cylinder, with the cylindrical compartment located in the cylinder at a position remote from the piston rod. The liquid-filled space of the other peripheral compartment communicates, through openings formed at the other end of the cylinder, with the annular compartment surrounding the piston rod in the cylinder. The self-pumping device is constituted by one or more passages passing through the piston and controlled by one way valve means biased by a spring, which permits liquid to flow only from the cylindrical compartment into the annular compartment. The return line extends away from an opening formed towards the center of the cylinder wall and opens into the first mentioned of the said liquid-filled spaces.

Although it is possible to provide a damper device in the cylinder, between the piston and orifices which lead from the cylindrical compartment to the peripheral compartment of the suspension chamber, the applicants have observed that adequate damping of the suspension is obtained if this damping device is omitted, this at any rate in certain applications and if the suspension jack is primarily a shock absorber, that is to say cooperates with springs and only carries a small part of the vehicle weight.

However, it is well known that the flexibility of a suspension designed using oleopneumatic struts, whether these are employed on their own or in combination with springs and especially if they are associated with a level-control device, is fundamentally variable. It is desirable that the damping action should be matched to the flexibility and should therefore itself be variable. In particular, in a suspension system comprising springs and eleopneumatic struts, the springs have a substantially constant stiffness in their working range, whilst the stiffness of the oleopneumatic struts varies with the vehicle load, especially if these struts have automatic level control. Variable damping is thus the more desirable the greater the part played by the struts in the suspension function.

This is why, in accordance with one feature of the present invention, variable damping is effected by means of a device which regulates the flow of hydraulic fluid in a passage between a variable-volume compartment and a compartment containing gas under pressure, so that the cross-sectional area of the flow passage decreases when the pressure in the oleopneumatic suspension chamber rises.

In one embodiment, this device regulates the flow of fluid in the oleopneumatic suspension chamber and to this end comprises a piston subjected to the pressure in the chamber, against the action of a spring, which piston can cover to a greater or lesser extent the openings which pass the flow.

In another embodiment, a variable damper device regulates the flow of hydraulic fluid in the reservoir, between that compartment thereof located in the cylinder and that compartment associated therewith and containing the gas under pressure, acting in fact by reducing the cross-sectional area available for the flow when the pressure in one of said two compartments diminishes. The result, once again, is that damping is the greater the heavier the load on the vehicle. In other words, an increase in the load produces an increase in the pressure in the suspension chamber and therefore a reduction in the pressure in the other compartments, since the mass of the hydraulic fluid and the gas, is constant.

When, as will generally be the case, that compartment of the reservoir which is located in the cylinder is the annular compartment surrounding the piston rod of the suspension strut, the variable damper device can comprise a piston sliding in a bore formed in a block surrounding the cylinder, said piston being subjected on one of its faces to the pressure prevailing in the pressure-container compartment (acting against the force of a spring), and being equipped with an element designed to regulate the flow cross-sectional area.

The description which now follows in relation to the attached drawings, given by way of non-limitative examples, will provide an understanding of the advantages of the invention and the method by which the latter is realised.

FIG. 1 is a longitudinal sectional view of one embodiment of a shock absorber in accordance with the invention, in operation;

FIGS. 2, 3 and 4 are fragmentary views on a larger scale, similar to FIG. 1, respectively illustrating the top, central and bottom parts of the shock absorber;

FIGS. 5 is a sectional view on the line V—V of FIG. 4;

FIG. 6 is a fragmentary view similar to that of FIG. 2, showing a variant embodiment comprising a conventional damping partition;

FIG. 7 is a fragmentary view similar to those of FIGS. 2 and 3, illustrating an embodiment in which the oleopneumatic suspension chamber comprises a variable damper device; and FIG. 8 is a fragmentary view similar to those of FIGS. 3 and 4, showing an embodiment in which the reservoir comprises a variable damper device.

The shock absorber shown in FIGS. 1 to 5 is housed in a hollow profiled body 1 of generally cylindrical form open at its two ends, made of steel and designed to withstand pressures in the order of 200 bars. One of the ends of the hollow body 1 has been press-formed inwards, at 10, over a metal end cover 2 which externally carries a screwed extension 3 to which there is screwed an element 4 used to secure the shock absorber to a suspended part of a vehicle. This extension 3 contains a passage 5 closed off by a needle screw 6.

The end cover 2 is provided at its periphery with two shoulders 7 and 8. The shoulder 7 carries an O-ring 9 which, when the cover 2 is force-fitted against the press-formed portion 10 of the body 1, is deformed in its seating and provides a perfect seal between the cover 2 and the body 1. The cover 2 is provided on its internal face with a blind bore 11 counterbored at 12. In the bore 11, there engages the end of a tube 13 coaxial with the hollow body 1. A piston 14 fixed to the end of a rod 15 can slide in the tube 13. The rod 15 passes through a plug 16 fitted to the end of the tube 13 opposite to the cover 2. The plug 16 is itself centred in an annular end cover 17 screwed into that end of the hollow body 1 opposite to the end cover 2. To said end cover 17 there is externally fixed, around the rod of the piston 15, a scraper seal 18 designed to prevent dirt and foreign bodies from being entrained by the rod into the interior of the shock absorber. In a location 19 at the end of the plug 16 adjacent to the end cover 17, a lip seal 20 is fitted. Above the location for this seal, the plug 16 is provided with a longer and shallower location in which an anti-friction ring 21 is fitted, to guide the rod 15, the ring being made of an alloy containing teflon impregnated with molybdenum disulfide. In another annular location in the plug 16, disposed above said antifriction ring, there is fitted an elastic ring 22 designed to limit the extension of the rod 15 and absorb the impact of the piston 14 against the metal mass of the plug 16. At its internal end, that is to say at the end opposite to the end cover 17, the plug 16 is provided above the elastic ring 22, with a chamber 23 from which there extend a plurality of passages 24 directed parallel to the rod 15 and opening into a recess 24a formed at the plug end. There also opens into the chamber 23 a bore 25 coaxial with the rod 15 and of larger diameter than the latter, said bore 25 being counterbored at 26 to a diameter equal to the external diameter of the tube 13 and less than the diameter of the recess 24a. The tube 13 is fitted in said counterbore 26. When the end cover 17 is screwed into the hollow body 1, as explained hereinbefore, the base of the counterbore 26 comes up against the end of the tube 13 and pushes the other end of this tube into contact with the end cover 2, thus ensuring that the O-ring 9 provides an effective seal.

At the end 27 of the rod 15 opposite to the piston, there are attached elements 28 which serve to fix the rod to an unsprung part of the vehicle. An elastic sleeve 29 engaged over the rod 15, prevents any metal to metal contact when the shock abosrber is completely retracted.

The end cover 17 contains a passage 30 which is sealed by a screw 31 with a seal 32. The passage 30 opens into a circular groove 33 machined in the internal face of the end cover 17, around the plug 16. Into this groove 33 there open passages 34 passing through an intermediate ring 35 resting against the internal face of the end cover 17 and exhibiting a shoulder 35a which is clamped by said end cover against the shoulder 16a on the plug 16. In the bottom face of said ring 35 there are formed, at either side of the groove 33, two annular locations in which seals 36 and 37 are fitted to seal off the annular space defined by said groove, and to support the two components 16 and 17. At the periphery of the ring 35 circular grooves 38 are machined the purpose of which will be indicated hereinafter.

Two elastic rings 39, 40 located partly in annular grooves formed in the external wall of the tube 13, maintain in position on the central part of said tube two thick super-imposed discs 41, 42 located opposite an internal thickening 43 in the wall of the hollow body 1, and fitting in precise fashion in the bore thus defined. Though the disc 42 is pierced a passage 44 which opens into an annular recess 45 formed in that face of the disc which is in contact with the disc 41. The wall of the tube 13 is traversed, level with the recess 45, by a port 46 which opens into said recess and enables the interior of the tube to communicate with the space surrounding same and delimited by the top face of the disc 42.

An elastic diaphragm 47, made of an elastomer which is impervious to mineral oils and gases, is arranged in the annular compartment defined between the tube 13 and the hollow body 1 below the disc 41. This diaphragm has a molded profile and comprises at its ends circular lips 48 and 49 which locate respectively in the circular groove 38 formed in the ring 35 and in a circular groove 41a in the disc 41, thus providing a seal between the walls of the body 1, the disc 41 and the ring 35. This diaphragm 47 delimits two spaces, namely a space 50 between itself and the hollow body 1 and a space 51 between itself and the tube 13. The wall of the latter is traversed, level with the recess 24a, by a very small diameter calibrated orifice 52 which forms a restricted passage between the interior of the tube and said space 51. The orifice through which the passages 24 open into the base of the recess 24a, are closed off by a valve element 54 (see also FIG. 5) in the form of an elastic ring doing duty as a spring (for example made of spring steel). This valve element is fixed on a diametral axis, by two screws 55; the orifices of the passages 24 are grouped in a zone diametrally opposite the fixing axis (see FIG. 5).

The seal between the disc 41 and the tube 13 is effected by an O-ring 56 located in a circular groove machined in the disc bore.

An elastic diaphragm 57 of the same type as that 47 is arranged in the annular compartment between the tube 13 and the hollow body 1, above the disc 42. This diaphragm 57 likewise has a molded profile and comprises at its ends circular lips 57a and 57b which locate in the circular grooves machined in the discs 42 and 2, in order to provide a seal between these discs in the hollow body 1. This diaphragm 57 also delimits two spaces 58 and 59, the space 58 being located between the diaphragm and the wall of the hollow body 1 and the space 59 being located between the diaphragm and the tube 13.

Through the medium of drillings 60 passing through the wall of the tube 13 at the level of the recess defined by the counterbore 12, the space 59 communicates with the internal compartment of the tube 13. which is located above the piston 14. The passage 44 passing through the disc 42 likewise opens into the space 59. The space 58 can communicate with the exterior through a hole 61 drilled in the wall of the hollow body 1 and closed off by a screw 62 with a seal 63. Similarly, the space 50 communicates with the exterior through a hole 64 likewise drawn in the wall of the hollow body 1 and closed off by a screw 65 fitted with a seal 66.

The internal end of the rod 15 is machined to form two portions of decreasing diameter 67, 68, followed by a screwed portion 69. Over the portion 68 there engages the piston 14 which is held in position by a lock nut 71 screwed onto the thread 69. On the portion 67 there is centered a coil spring 70 seating against the shoulder 15a of the rod and biasing a valve 72 over the orifices 73a of passages 73 passing through the body of the piston.

The operation of the shock absorber is as follows :

The shock absorber is filled with oil through the passage 5 after the stop screw 6 has been removed, the bleed passage 30 being opened by unscrewing the screw 31. Filling is carried out under pressure so that the shock absorber is properly filled and the air contained in the tube 13 as well as in the chambers 51 and 59 fully bled off. After this filling operation, the passages 5 and 30 are hermetically sealed again, by screwing back the plug screws.

The spaces 50 and 58 are filled with gas under high pressure through the passages 61, 64 and these latter are then hermetically sealed by means of the plug screws 62 and 65.

The piston 14 fits in the tube 13 so that it slides without any play; if required, the piston can be equipped with sealing segments so that the compartments situated at either side of it, namely the top cylindrical compartment 74 and the bottom annular compartment 53, cannot communicate through the gap between the piston 14 and the tube 13. The spaces 50 and 58 are filled with gas at the same pressure; this pressure acts through the medium of the oil filling, on the one hand on the total area of the piston at the side facing the compartment 74, and on the other hand on an annular, smaller area at the side facing the compartment 53. The rod of the shock absorber therefore tends to move out of the tube 13 and the piston 14 descends through the tube towards the plug 16 when the device carries no load.

When the shock absorber is assembled between the sprung and unsprung parts of a vehicle in the manner of a conventional shock absorber of the self-pumping type, it thus tends to maintain the sprung parts at a higher level than the conventional shock absorber would. It would be particularly advantageous to fit shock absorbers in accordance with the invention to the rear suspension systems of private cars, because it is at this point that these vehicles generally experience the greatest changes in load. It is opposite the rear seats that the vehicle experiences the most substantial variations in attitude and it is therefore at this point that it is most necessary to correct these variations which have a highly undesirable effect upon road-holding and comfort.

The precaution is taken to "inflate" the spaces 50 and 58 to an adequate pressure so that when the shock absorber is assembled on the vehicle, the piston 14 is located below the level of the part 46, that is to say between this opening and the plug 16, so that the suspended parts of the vehicle are above their mean level, that is to say above the level which gives the horizontal attitude generally accepted as ideal by car designers. When the vehicle is at a halt, the shock absorbers act in a static fashion: the normal maximum load of the vehicle (carried by the conventional suspension and with the assistance of the shock absorbers in accordance with the invention) is such that the piston always remains below the level of the opening 46.

From this "high" position of the vehicle, the shock absorber will operate dynamically when, with the vehicle in motion, the oscillations of the suspension produce alternating motions of the rod 15. When the rod moves back into the tube, the compressing of the oil increases the pressure in the gas space 58 and consequently also in the compartment 74, whilst the pressure reduces in the annular compartment 53, on the one hand because this latter increases in volume and on the other because the calibrated very small diameter orifice 52 only slowly replenishes it from the sapce 51. A certain volume of oil is therefore transferred from the compartment 74, through the passages 73 and, lifting the valve 72, into the annular compartment 53. When, with the next oscillation, the rod 15 moves out of the tube 13, the oil cannot return to the compartment 74 because the valve 72 has closed; oil flows from the annular compartment 53 into the space 51 through the passages 24 and past the non-return valve 54, so that the movement of the rod is slowed by the compression of the gas in the space 50.

The alternating movements of the rod thus produce transfer of oil from the space 59 and the compartment 74 to the compartment 53 and the space 51, causing the piston to progressively ascend. As soon as the top face 5 of the piston moves up below the port 46, communication between the compartment 74 and the space 59 is established through said port 46 and the orifices 60. When the top face S of the piston has passed the port 46, communication is restricted to the orifices 60. When the bottom face I of the piston uncovers the port 46, the annular compartment 53 is placed in communication with the space 59 through the passage 44 so that the pressures throughout the shock absorber balance and the correcting movement stops at the mean level defined by the position of said port 46. Fron this moment onwards, the oscillations of the suspension around this mean level produce phenomena similar to those occurring in a conventional self-pumping shock absorber, that is to say that the suspension is maintained at this mean level.

It is worth pointing out that in what has been termed dynamic operation, that is to say when the vehicle is travelling over the road, the rod of the shock absorber carries out an oscillatory movement and on opening of the valve 72, it is the pressure in the compartment 74 which acts on the area of the rod 15 to determine the lift force of the device. To put it more simply, one could say that the load is carried by the cross-sectional area of the piston rod. The compartment 74 forms together with the oil space 59 and the compressed gas space 58, the arrangement referred to as the suspension chamber in the introduction to the present description; in dynamic operation, the pressure in this suspension chamber acts upon the cross-section of the piston rod 15 to support the load on the shock absorber. In the static condition, on the other hand, that is to say when the vehicle is at a halt, the pressure in the suspension chamber acting upon the full area of the piston 44, balances the sum of the shock absorber load (the force tending to retract the piston 15 into the tube 13) and the force applied to the piston by the pressure prevailing in the annular compartment 53 and acting upon the annular area of the piston, around the rod 15. As explained hereinbefore, the "inflating" of the shock absorber, that is to say the gas masses contained in the spaces 50 and 58, is chosen so that, in said static condition, the piston 14 will be located below the level of the port 46. Thus, as the piston was located at the level of the port 46 with substantially equal pressures in compartments 76 and 53 in dynamic condition, the piston will move downwards to its static position as soon as the vehicle is halted, with the result that the pressure in compartment 74 will decrease and the pressure in compartment 53 will increase. It ensues that, in static condition, the pressure in the annular compartment 53 is higher than the pressure in the suspension chamber, whatever the load on the vehicle. In other words, there is a differential pressure between the compartments 53 and 74; the pressure in the suspension chamber, acting upon the cross-sectional area of the piston rod 15, balances the sum of the shock absorber load and the force exerted by said differential pressure upon the annular area of the piston 14, surrounding the rod 15. When the vehicle starts and as long as the mean suspension level has not yet been reached, pumping through the passages 73 and the piston 14 is effected from a suspension chamber at relatively low mean pressure to a reservoir (annular compartment 53 and compartment 50–51) where a higher mean pressure prevails. It is the oscillations of the suspension system which temporarily reverse the pressure ratio so that the opening and closing of the valve 72 are akin to the operation of a hydraulic ram.

The volume of oil transferred with each reciprocation of the piston 14 from the suspension chamber to the reservoir, depends upon the ratio between the area of the piston 14 and that of the rod 15; commencing from the halted condition of the vehicle, the suspension will reach its mean level the more rapidly the higher this ratio is. On the other hand the lift force exerted by the shock absorber depends upon the cross-sectional area of the rod 15. Therefore, there are two independent dimensional parameters which make it possible to construct a shock absorber which has the desired lift force and provides the desired rate of return of the suspension to its mean level, when the vehicle starts.

In the embodiment shown in FIGS. 1 to 5, the damping of the suspension is effected by the pressure losses in the oil flowing through the passages 73 in the piston and through the calibrated orifice 52 establishing communication between the annular compartment 53 and the space 51 of the oleopneumatic compartment 50, 51. This damping can provide very adequate suspension for a private car. However, it is possible, in the event that this damping should be insufficient, to restrict the oil flow in a manner well know per se, between the compartment 74 and the space 59.

FIG. 6 illustrates an embodiment of a damping partition which produces this kind of restrictions. The tube 13 is equipped at its top part with a partition 100 traversed by passages 101 and 101a, cooperating with two disc valves 102 and 103, known per se, to restrict the flow of fluid between the compartment 74 and the space 74a located above the partition 100, into which space the orifices 60 open. For example, the valve 103 will be perforated opposite the passages 101 so that oil can flow upwards through these, lifting the valve 102, the latter being perforated opposite the passages 101a so that the oil flows downwards through these passages 101a, lifting the valve 103. Washers 104 and 105 acting as profiled stops, limit the valve travel. A bolt 106 is used to clamp the assembly of said washers and valves to the partition 100 the latter itself being fixed in the tube 13 by some appropriate means or other.

FIGS. 7 and 8 illustrate two different embodiments comprising a variable damping device. In these Figures, elements which perform the same function as in the preceding Figures, have been given the same references.

In FIG. 7, the end of the cylinder 13 remote from the piston rod 15, is sealed by a metal plug 201 which also closes off the end of the metal body 1 coaxial with the cylinder 13 and forming the external wall of the external annular spaces 50 and 58.

The device which regulates the flow of oil between the variable-volume compartment 74 and the internal space 59 of the annular compartment, comprises orifices or holes 202 in the wall of the cylinder 13, which can be covered to a greater or lesser extent by a piston 203 slidably assembled in the end of said cylinder and subjected to the opposite forces exerted by the pressure prevailing in the compartment 74, and by a spring 204 constituted by a stack of Belleville washers 204a. The openings 202 are circular in the embodiment shown but it goes without saying that in other embodiments, they could have any other shape to suit the particular application.

The piston 203 is provided with an extension of reduced diameter 203a which can slide in a blind bore 205 in the plug 201 in order to guide the displacement of the piston 203. The entrance of said blind core is counterbored at 205a in order to form around the extension 203a an annular location in which there are stacked Belleville washers 204a acting as the spring 204 which is compressed between the annular base of the counterbore and the body of the piston 203, the latter normally being maintained in contact, by said spring, with a slotted steel ring 206 elastically located in an annular groove 206a machined in the internal face of the wall of the cylinder 13.

A O-ring 207 fitted in an annular groove 207a of the body of the piston, provides a seal vis-a-vis the wall of the cylinder 13 and thus prevents oil in the compartment 74 from penetrating into the counterbore 205a and the bore 205 where it could interfere with or prevent the displacement of the piston 203. In the embodiment illustrated, the base of the bore 205 is provided with a vent 208 open to the atmosphere but in other embodiments, this vent could be dispensed with.

That face of the piston 203 disposed towards the compartment 74 contains a recess 209 which communicates through radial drillings 210 with an annular groove 211 machined in the external cylindrical surface of said piston, between the groove 207a and the compartment 74. The orifices 202 in the cylinder 13 are arranged in a ring and open with their full cross-sectional areas into the top part of the groove 211 when the piston 203 is up against the ring 206. The groove 211 has a height at least equal to that of the orifices 202 so that if the pressure in the compartment 74 progressively rises in order to cause the piston 203 to progressively displace, compressing the Belleville washers 204a, the orifices 202 are progressively covered by the cylindrical wall 203b of the piston, which wall is defined between the groove 211 and the compartment 74.

The pressure in the compartment 74 rises of course as the vehicle load increases. More precisely, when the vehicle is in motion, the oscillations of the piston 14 in the cylinder 13 cause frequent opening of the valve 72 so that the pressure in the compartment 74 acts upon the cross-sectional area of the piston rod 15 to support the load applied to the suspension strut. On the other hand, the oscillations of the piston, as indicated hereinbefore, cause transfers of oil to take place from the compartment 74 to the compartment 53 and from the latter to the space 59; these oil transfers are accompanied by exchanges of oil between the compartment 53 and the space 51 through the small-area calibrated orifice 52 (FIGS. 1 and 4), and between the space 59 and the compartment 74 through the orifices 202.

The Belleville washers 204a are fitted with a certain preload so that the piston 203 is up against the ring 206 when the vehicle is unloaded. When the vehicle is running and carries a low or medium load, the pressure in the compartment 74 causes the piston 203 to move off its stop 206 and to compress the Belleville washers but these latter have a stiffness such that the orifices 202 still open with a substantial area into the groove 211. The damping of the suspension is then effected by the slight restriction of the oil flow through the uncovered cross-sectional areas of the orifices 202, and by the substantial oil flow restriction through the valve 72 and the small-area calibrated orifice 52 (FIGS. 1 and 4).

When the vehicle is running with a heavy load on board, the pressure in the compartment 74 moves the piston 203 further away from its stop 206 so that the orifices 202 are partially covered by the cylindrical wall 203b of the piston. The oil flow across the orifices 202, required to effect oil transfers between the space 59 and the compartment 74, are thus restricted and this increases the damping action of the suspension. The heavier the load on the vehicle the more the piston 203 moves away from its stop 206 and the more it covers the orifices 202. Thus, the heavier the load the higher the damping.

The stiffness of the Belleville washers 204a and the relative sizes of the groove 211 and the orifices 202 can be chosen in order to match the throttling of these orifices through the particular characteristics of the suspension with which the oleopneumatic strut is associated. It is this throttling action which regulates the damping by dissipating in viscous throttling, through restriction of the oil transfers between the space 59 and the compartment 74, a part of the elastic energy accumulated in the suspension springs of the jack.

To properly understand the embodiment of FIG. 8, it must be remembered that in dynamic operation (that is to say whilst the vehicle is moving, the piston 14 reciprocates in the cylinder 13), said piston 13 pumps liquid from the compartment 74 into the compartment 53 and the load on the suspension strut is supported virtually by the pressure in the compartment 74 acting upon the cross-sectional area of the piston rod 15. For the pumping action to take place, it is necessary for the oil to be prevented from passing from the space 51 to the compartment 53 except via the very small-area orifice 52. The oil can also be passed from the compartment 53 into the space 51 through a passage 301 the opening of which latter, into said space 51, is controlled by a non-return valve 302.

We can consider the compartment 53 as forming, together with the compartment containing the gas under pressure (constituted by the spaces 51 and 50), an oil accumulator, the levelling of the suspension jack being effected by pumping oil from the suspension chamber 74–59–58 to said accumulator 53–51–50 (by the piston 14) and by discharging oil from the compartment 53 to the suspension chamber (when the bottom edge of the piston 14 temporarily uncovers the opening 46). In view of the fact that it is the pressure in the compartment 74 (therefore the suspension chamber) which in effect supports the load on the jack, this pressure must obviously increase with said load, but, since the strut contains a fixed mass of oil and a fixed mass of gas, this pressure increase necessarily produces a pressure reduction in the accumulator 53–51–50. In other words, the pressure in said accumulator 53–51–50 and more particularly in the compartment 51–50, will be the lower the higher the load on the jack.

The oil pressure in the space 51 is utilised to control a device 303 which regulates the cross-sectional area of the passage 301 in order to reduce said area when said pressure reduces and to increase it when said pressure increases.

The bottom terminal part of the cylinder 13 is surrounded by an annular component 304 which is provided at its internal side with a peripheral groove 304a in which there engages the bottom lip 48 of the diaphragm 47. This bottom part of the component 304 is engaged in the tubular body 1 which contains the spaces 58 and 50 and the lip 48 is clamped in a sealed fashion between the component 304 and said tubular body 1. The annular component 304 seats on a plug 305 which also serves to hold the seal 305a for the piston rod 15 and is held in the tubular body 1 by a retainer 305b. It is this annular component 304 which holds the device 303.

The passage 301 is formed by a bore 301a passing radially through the wall of the cylinder 13 and opening into a drilling 301b produced in the component 304 parallel to the axis of the jack, this drilling itself opening into the base of a recess 301c machined in the top face of said component 304. The valve 302 is constituted by a bore 302a which is biased onto the orifice of the drilling 301b at the base of said recess, by a flat spring steel ring 302b fixed to the top face of the component 304 by one or more screws 302c. The drilling 301b opens coaxially, at its other end, into a bore 306 connected by a shoulder 306a to a coaxial bore of larger diameter 307 which opens into the bottom face of the component 304 coaxially with a drilling 308 passing through the plug 305. A passage 309 formed in the component 304 provides communication between the bore 306 and the annular space 51.

The device 303 which regulates the cross-sectional area of the passage comprises a rod 310 with a profiled tip 310a which extends into the drilling 301b opposite the point at which the passage 301a opens there. The other end of said rod 310 is fixed to a piston 311 slidable in the bore 307 and provided with a seal 311a. A guide rod 311b fixed to the piston 311 and located in an extension of the rod 310, engages in the drilling 308 beyond the bore 307. The piston 311, guided in this fashion, is subjected to the opposite forces produced by the pressure prevailing in the bore 306 which communicates with the space 51, and by a spring 312 constituted by a stack of Belleville washers 312a assembled in the annular location formed by the bore 307 around the guide rod 311b.

Said stack of Belleville washers is compressed between the plug 305 and the piston 311 and has a fitted load such that the piston is up against the shoulder 306a when the pressure in the space 311 is less than the lowest value which it can adopt in any situation of normal loading of the vehicle. This position, which corresponds to a heavy overload on the vehicle, is shown in the drawing; it will be seen that in this position, the rod 310 virtually completely shuts off the opening of the passage 301a into the drilling 301b, so that the compartment 53 only communicates with the space 51 through the very small-area orifice 52. If the vehicle were moving under these conditions, the transfer of oil from the compartment 53 to the space 51 would be very severely restricted so that the descending movements of the piston 14 in the cylinder 13 would be very highly damped.

When the vehicle is rolling under a normal load, the pressure in the space 51 is higher, as we have seen, and displaces the piston 311 away from its stop 306a so that profiled tip 310a of the rod 310 uncovers a certain flow cross-section at the point at which the passage 301a joins the drilling 301b. As the drawing show, this end is tapered that is to say it is profiled so that the flow cross-sectional area increases as the rod 310 descends into the drilling 301b. The result is that the flow of oil from the compartment 53 in the space 51 is restricted more and more severely (thus the damping of the downward movement of the piston is damped more and more effectively) as the vehicle is more heavily loaded.

The damping is associated with two variables which are the cross-sectional area of the passage 301 and the hydraulic thrust produced by the oil, so that two parameters are available to regulate the damping, namely the "inflation" pressure of the spaces 58 and 50 and the shape of the profile of the tip 310a of the rod 310.

The device described in relation to FIG. 8 which regulates the flow of hydraulic fluid between the annular compartment surrounding the piston rod in the cylinder of the strut, and an associated compartment containing gas under pressure, can be employed either on its own or in combination with the device described in relation to FIG. 7, this regulating the flow of hydraulic fluid between that compartment of the cylinder remote from the one in which the piston rod is located, and an associated compartment containing gas under pressure. This combination forms part of the invention.

What is claimed is:

1. A suspension strut comprising a suspension chamber and a storage chamber both containing pressurized fluid; a reciprocable piston assembly having a first cross section area exposed in a first direction to the pressure in the suspension chamber, in order to support a load, and a second cross section area smaller than the first cross section area and exposed to the pressure in the storage chamber which acts in a second direction opposite to the first direction; and an automatic level-control device including a self-pumping device responsive to reciprocating movement of the piston assembly to convey fluid from the suspension chamber into the storage chamber, and means interconnecting both said chambers in response to the suspension strut being less extended than a predetermined length.

2. A suspension strut as claimed in claim 1, wherein the suspension chamber incorporates a liquid-filled compartment whose volume is varied by said reciprocating movement of the piston assembly, a compartment containing liquid and gas under pressure, and passage means interconnecting both said compartments, comprising means for reducing the passage area of said passage means in response to an increase in pressure in the suspension chamber.

3. A suspension strut as claimed in claim 2, wherein the storage chamber incorporates a further liquid-filled compartment whose volume is varied by said reciprocating movement of the piston assembly, a further compartment containing liquid and gas under pressure, and further passage means interconnecting both said further compartments, comprising means for reducing the passage area of said further passage means in response to a reduction in pressure in the storage chamber.

4. A suspension strut as claimed in claim 1, wherein the storage chamber incorporates a liquid-filled compartment whose volume is varied by said reciprocating movement of the piston assembly, a compartment containing liquid and gas under pressure, and passage means interconnecting both said compartments, comprising means for reducing the passage area of said passage means in response to a reduction in pressure in the storage chamber.

5. A hydrodynamic suspension strut of the self-pumping type, comprising a piston having a piston rod and reciprocable in a cylinder filled with hydraulic liquid, the piston separating the cylinder into a cylindrical compartment forming part of a suspension chamber and an annular compartment surrounding the piston rod and forming part of a storage chamber; a fluid-spring compartment also forming part of the suspension chamber and containing hydraulic liquid and gas under pressure; a passage for the hydraulic liquid, interconnecting the cylindrical compartment and the fluid-spring compartment; a pressure-container compartment also forming part of the storage chamber and containing hydraulic liquid and gas under pressure; a restricted passage for the hydraulic liquid interconnecting the annular compartment and the pressure-container compartment, and an one-way passage leading from the annular compartment to the pressure-container compartment; passage means through the piston, and one-way valve means for allowing the flow of hydraulic liquid through the passage means from the cylindrical compartment to the annular compartment; and conduit means leading from a port in the peripheral wall of the cylinder at a point intermediate along the same, to the suspension chamber.

6. A suspension strut as claimed in claim 5, wherein the conduit means leads to the fluid-spring compartment.

7. A suspension strut as claimed in claim 5, comprising an outer hollow body of generally cylindrical shape defining about the cylinder an annular gap, the fluid-spring compartment and the pressure-container compartment being located in the annular gap at either side of an annular partition; and elastic diaphragm means of generally cylindrical form separating each of the fluid-spring and pressure-container compartments into an annular space filled with gas under pressure, and an annular space filled with hydraulic liquid; wherein said passage interconnects the cylindrical compartment and the liquid-filled space of the fluid-spring compartment; and wherein said conduit means lead from said port to said liquid-filled space of the fluid-spring compartment through said annular partition.

8. A suspension strut as claimed in claim 5, comprising damping means for restricting the flow of hydraulic liquid through said passage interconnecting the cylindrical compartment and the fluid-spring compartment.

9. A suspension strut as claimed in claim 8, wherein said passage comprises a further port in the peripheral wall of the cylinder, and said damping means comprise a further piston slidable in the cylinder under the action of the pressure in the cylindrical compartment and against the force of a spring, in a direction to reduce the passage area of the further port in response to an increase of pressure in the cylindrical compartment.

10. A suspension strut as claimed in claim 9, wherein said further piston comprises an annular peripheral groove reciprocable past the further port, and further passage means leading from the cylindrical compartment to said groove, comprising abutting means for limiting the displacement of the further piston by the spring, to a position wherein the further port opens with its full area onto the annular groove.

11. A suspension strut as claimed in claim 10, wherein the height of the annular groove, as measured axially to the cylinder, is greater than the height of the further port, and the further port registers with that portion of the annular groove which is remote from the abutting means, in said position of the further piston.

12. A suspension strut as claimed in claim 5 comprising a variable-damping device incorporating means for reducing the passage area of said one-way passage in response to a reduction of pressure in the pressure-container compartment.

13. A suspension strut as claimed in claim 12, wherein the variable-damping device comprises a control piston slidable in a bore formed in a block surrounding the cylinder, the control piston being exposed to the pressure in the pressure-container compartment, against the force of a spring, and a control member operable by the control piston to control the passage area of the one-way passage.

14. A suspension strut as claimed in claim 13, wherein the control member comprises a rod having a tapered tip and movable by the piston to move the tapered tip across the one-way passage.

15. A suspension strut as claimed in claim 14, wherein said rod is slidable in a drilling formed in the block and communicating with the pressure-container compartment, into which drilling there opens a bore extending from the annular compartment, the tapered tip of the rod projecting in front of the orifice of said bore.

* * * * *